United States Patent [19]
Sauer

[11] Patent Number: 4,797,244
[45] Date of Patent: Jan. 10, 1989

[54] MULTIWALLED CONTAINER AND METHOD OF MAKING SAME

[75] Inventor: Donald G. Sauer, Harwinton, Conn.

[73] Assignee: American National Can Company, Chicago, Ill.

[21] Appl. No.: 644,056

[22] Filed: Aug. 23, 1984

Related U.S. Application Data

[63] Continuation of Ser. No. 426,269, Sep. 29, 1982, abandoned.

[51] Int. Cl.4 .................. B29C 45/14; B29C 45/16; B29C 49/06; B29C 49/22
[52] U.S. Cl. .................................. 264/266; 264/513; 215/12.2
[58] Field of Search ................ 215/1 C, 12 R, 12.2; 220/453; 264/266, 513

[56] References Cited

U.S. PATENT DOCUMENTS

| | | | |
|---|---|---|---|
| 2,802,309 | 8/1957 | Brune | 215/12 R X |
| 3,144,167 | 8/1964 | Schultz | 215/1 C |
| 3,703,255 | 11/1972 | Wade | 220/453 X |
| 3,869,056 | 3/1975 | Valyi | 215/1 C |
| 4,013,748 | 3/1977 | Valyi | 264/266 X |
| 4,079,851 | 3/1978 | Valyi | 215/1 C |
| 4,092,391 | 5/1978 | Valyi | 215/1 C X |
| 4,162,883 | 7/1979 | Sauer | 425/387.1 |
| 4,256,449 | 3/1981 | Sauer | 425/388 |
| 4,267,928 | 5/1981 | Curry, Jr. | 206/583 |
| 4,309,380 | 1/1982 | Sauer | 264/511 |

FOREIGN PATENT DOCUMENTS

| | | | |
|---|---|---|---|
| 2444267 | 4/1975 | Fed. Rep. of Germany | 264/266 |
| 921830 | 3/1963 | United Kingdom | 215/12 R |
| 1211769 | 11/1970 | United Kingdom | 215/12 R |

Primary Examiner—Sue A. Weaver
Attorney, Agent, or Firm—Wallenstein Wagner Hattis & Strampel, Ltd.

[57] ABSTRACT

A multiwalled plastic container and method for making the same is disclosed having a barrier liner and an outer wall providing structural support for the liner. The container provides increased protection against separation of the liner and structural wall especially at the rim defining the opening of the container. This is accomplished by a wrap around liner lip construction wherein the liner extends from the inside surface of the structural wall around the top rim surface of the wall and downwardly depends therefrom along the outer surface of the structural wall. To downwardly depending leg of the liner lip is recessed within the outer wall surface providing adding protection against liner separation.

3 Claims, 5 Drawing Sheets

MULTIWALLED CONTAINER AND METHOD OF MAKING SAME

REFERENCE TO RELATED APPLICATION

This application is a continuation of application Ser. No. 426,269, filed Sept. 29, 1982, now abandoned.

TECHNICAL FIELD

The present invention relates to containers in general and in particular multiwalled plastic containers such as injection molded or injection blow molded plastic containers having an inner barrier liner and an outer structural wall. More specifically, the invention is directed towards an improvement of the container rim design to prevent separation of the inner liner from the rim of the outer wall of the container and a method for producing such improved containers.

BACKGROUND OF THE PRIOR ART

This invention relates to multiwalled plastic containers which are comprised of an inner liner and outer structural wall supporting the liner. The liner material typically has barrier properties, (such as with respect to moisture, oxygen, carbon dioxide, etc.) which are far superior to the plastic material forming the outer structural container wall. The container liner may be of a single layer or of a multilayer design wherein each layer may be formed of a different material having a specific barrier property. Such containers are constructed of multiwalled or multilayer design since all of the desired barrier properties generally cannot be provided by one material.

Various techniques for molding hollow plastic articles and containers are known in the prior art. By one technique the multiwalled containers are produced by an injection-blow molding procedure. In producing containers by this procedure a previously thermoformed liner is positioned over a core rod in an injection-blow molding machine. The core rod is then positioned in the cavity of an injection molding zone and an injectable heated thermoplastic resin is injected into such cavity to form a composite preform or parison, wherein the liner comprises the inner wall portion thereof. The core rod with the composite preform thereon is removed from such injection mold cavity and is positioned next in the cavity of a blow molding zone. Fluid pressure is exerted on the preform between the preform and the core rod to an extent sufficient to make the preform expand into contact with adjacent wall portions defining the blow mold cavity which results in the production of a blown container. The blown container is removed from the blow mold cavity and the blown container is then separated from the core rod. Specific details relating an apparatus, materials, and techniques for producing such containers can be found in U.S. Pat. Nos. 4,162,883 and 4,309,380, both of which are granted to Donald G. Sauer and assigned National Can Corporation.

One possible problem with some prior art multiwalled containers, wherein the inner liner and the outer wall have an exposed edge at the container lip, is that a separation of the liner from the rim of the structural outer wall may possibly occur under certain circumstances. Such liner separation if it occurs can produce a less than desirable appearance and can present sanitation problems.

One cause of the liner separation problem is that the prior art injection molded or injection blow molded containers have a relatively small overlap between the lip of the liner and the outer wall rim region. Typically, the liner extends at most to the outer edge of the structural wall rim and terminates at the junction between the top rim surface and outer vertical surface, or side wall, of the outer wall. Another draw back in the design of the prior art containers is that the edge of the liner lip is exposed, thereby increasing the chance that the liner may be subjected to forces which can peel the liner away from the structural wall rim to create the aforementioned crevices. Moreover, the separation problem can be compounded by the fact that friction may be developed between the container closure and the inner liner overlap during the application or removal of the closure which can initiate or further propagate a separation. Also, in the case of prior art containers utilizing a multilayer liner a separation of the individual layers at the liner lip can occur resulting in additional crevices at which the container contents become trapped and present a further undesirable appearance.

Thus it can be appreciated that a need exists for injection molded and injection blow molded multiwalled containers having a liner sufficiently secured thereto in a manner which will eliminate or reduce the possibility of liner separation at the container rim.

SUMMARY OF THE INVENTION

The disadvantages of the prior art are overcome by providing a container wherein the inner liner has a lip configuration which wraps around the rim of the outer structural wall to provide an improved interlock therebetween, and hence reduce the likelihood of liner separation at the container opening. The liner extends from the inner surface of the outer structural wall over its top rim surface and extends at least a short distance downwardly therefrom along the outer surface of the structural wall.

The downwarding depending over hang portion of the liner lip is recessed within the outer surface of the structural wall with the edge of the lip being covered and protected by the plastic material forming the outer wall. Such construction further resists a separation of the liner lip and the structural wall, and also reduces the possibility of separation of the individual layers of a multilayer liner when such liners are utilized.

The multiwalled containers of the present invention may be formed by injection molding wherein a preformed liner is inserted over a core rod and placed in an injection mold and then a molten plastic material is injected over the liner to form the outer structural wall of the container. The multiwalled containers may also be formed by injection blow molding which involves the additional step of blow molding the liner and injected over plastic material to expand the same to form the container body.

In forming such containers, a preformed liner of a configuration in accordance with the present invention is utilized. The preformed liner has wall portion forming a hollow body with a circumferential lip formed around its opening and extending outwardly therefrom. The lip forms an acute angle, for example approximately 30%, with the adjacent liner wall to provide a generally "V" shaped trough-like region about the circumference of the opening. Later, during the injection molding step of producing the container, the preformed liner lip is reformed to conform to the shape of adjacent surfaces of the injection mold when the injected plastic enters the trough-like region and forces the lip against the mold surfaces. Thus, the container rim area is formed to the desired configuration wherein the liner wraps around the rim of the plastic material forming the outer structural wall, and the structural plastic material covers and protects the circumferential edge of the liner.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION

Figure 1:
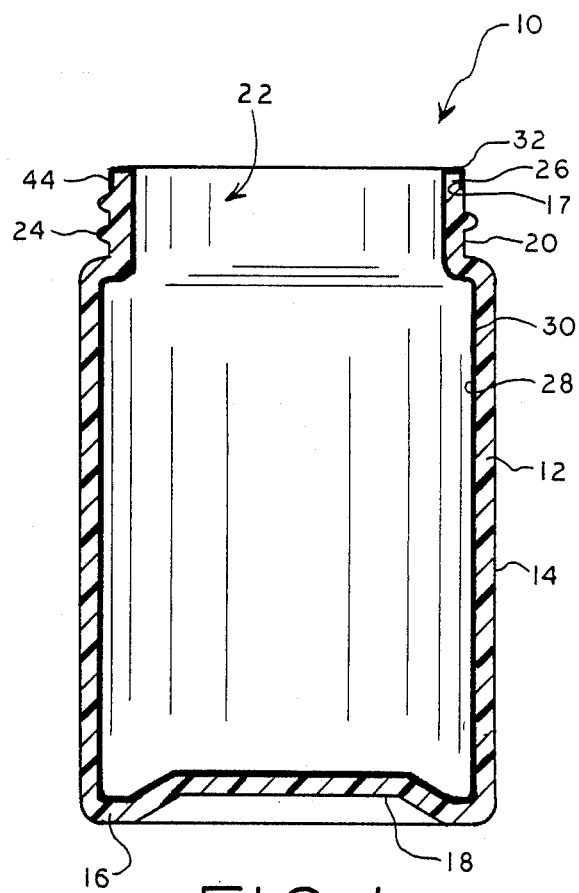
FIG. 1 is a sectional view of the multiwalled plastic container of the present invention.

FIG. 1 shows a multiwalled container 10 formed in accordance with the present invention having a hollow outer structural wall or layer 12 which has a side wall 14 and end wall, or bottom 16, which may have a domed portion 18 for increased strength. Side wall 14 may also have a necked-in portion 20 terminating at an annular rim 26 forming container opening 22. As shown in FIG. 1, neck portion 20 has integrally formed threads 24 for mating with a threaded closure (not shown) for sealing opening 22. Other conventional closure arrangements such as adhesive applied, snap on, or crimped closures, for example, could also be utilized in conjunction with the container of the present invention.

An inner liner 28, typically of a thickness of approximately 0.002 inches, is positioned within outer wall 12, which for example has a thickness of 0.065 inches in the neck region and a lesser thickness in the side wall. Liner 28 preferably adheres fully to the inner surface 30 of outer wall 12. Liner 28 may be formed of a single layer or wall of barrier material, or may be of multiple layer design wherein the layers may be formed of a different material each having certain superior barrier properties, with respect to moisture resistance, oxygen permeation resistance or carbon dioxide transmission, etc.

Figure 2:
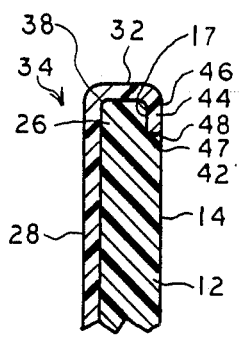
FIG. 2 is an exploded sectional view of the right rim area of the container of FIG. 1 showing the over wrapping liner lip configuration.

As best seen in FIG. 2 inner liner 28 has a circumferential lip 32 forming liner opening 34 at the top end of liner 28. Liner lip 32 extends from inner surface 38 of wall 14, over outer wall rim 26, and has a downwardly depending overhanging leg portion 44 which extends along the outer surface 42 of structural wall side wall 14. Thus lip 32 is made to completely over wrap outer wall rim 26 and interlock therewith. The length of leg 44 may be on the order of approximately 0.060 inches, although shorter or longer overhangs may also be employed. In the instance where a threaded closure is to be utilized for sealing opening 22, leg 44 of liner 28 preferably terminates above the first of threads 24 so as not to subject liner 28 to additional twisting forces generated during the application or removal of the closure. Of particular importance is that leg 44 is recessed within a recess 17 of structural wall 14 with circumferential end surface or edge 48 of liner lip 32 abutting shoulder 47. Edge 48 is completely embedded in the plastic material forming outer structural side wall 14 and the outer surface 46 of lip leg 44 may be flush with the outer surface 42 of side wall 14. It is also possible that recess 17 may be spaced away from the top of rim 26 with leg 44 extending along side wall 14 to enter recess 17 a location spaced downwardly from rim 26.

Figure 3:
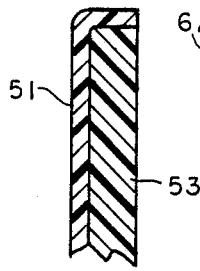
FIG. 3 is an exploded sectional view of the right rim area of a typical prior art plastic multiwalled container.

Thus it can be appreciated by comparison to the non-overhanging liner lip construction of a typical prior art plastic container having liner 51 and outer structural wall 53 as shown in FIG. 3, a number of advantages of the container of the present invention are apparent. First, the liner lip portion 32 completely overhangs and grips outer wall rim 26 to resist forces typically encountered by the container which otherwise tend to cause a separation of liner 28 from outer wall 14. Moreover, the full and continuous wrapped around lip configuration eliminates the chance of crevices forming on the top rim surface of the container to avoid the trapping of particles during the filling or dispensing of the container contents. Furthermore, since liner end 48 is flush against and protected by the plastic material of the outer wall 14, peeling away of liner 28 or a separation of the individual liner layers is far less likely to be initiated. Thus, the container of the present invention effectively overcomes the disadvantages of the prior art liner lip construction and the associated problems of liner separation in the container rim region.

LINER AND CONTAINER PRODUCTION

The container of the present invention may be formed utilizing conventional thermoforming and injection blow molding equipment, such as that described in aforementioned U.S. Pat. Nos. 4,162,883 and 4,309,380 respectively, with only minor modifications thereto as will become readily apparent from the following description. Before describing the method of production of the preformed liner it is first noted that its initial configuration of the preformed liner lip 70, as is shown in FIG. 4, is different than that assumed by the liner lip 32 after injection molding or injection blow molding the finished container as shown in FIGS. 1 and 2.

Figure 4:
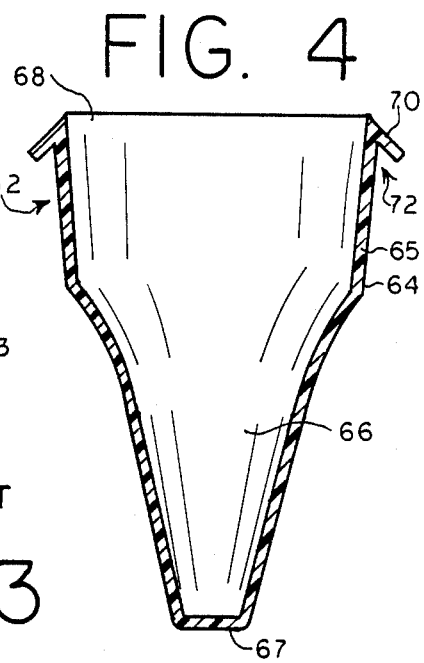
FIG. 4 is a sectional view of a preformed liner of the present invention for utilization in forming the multiwalled container of FIG. 1.

Referring to FIG. 4, there is shown the preformed liner 62 for producing the container of the present invention. Liner 62 has a wall 64, including a side wall 65 and a bottom 67, forming a hollow portion 66 with an opening 68. Wall 64 outwardly extends past opening 68 to form a circumferential lip 70 which together with the top of side wall 65 forms a generally "V" shaped portion, or trough-like region 72 of liner 62.

Figure 5:
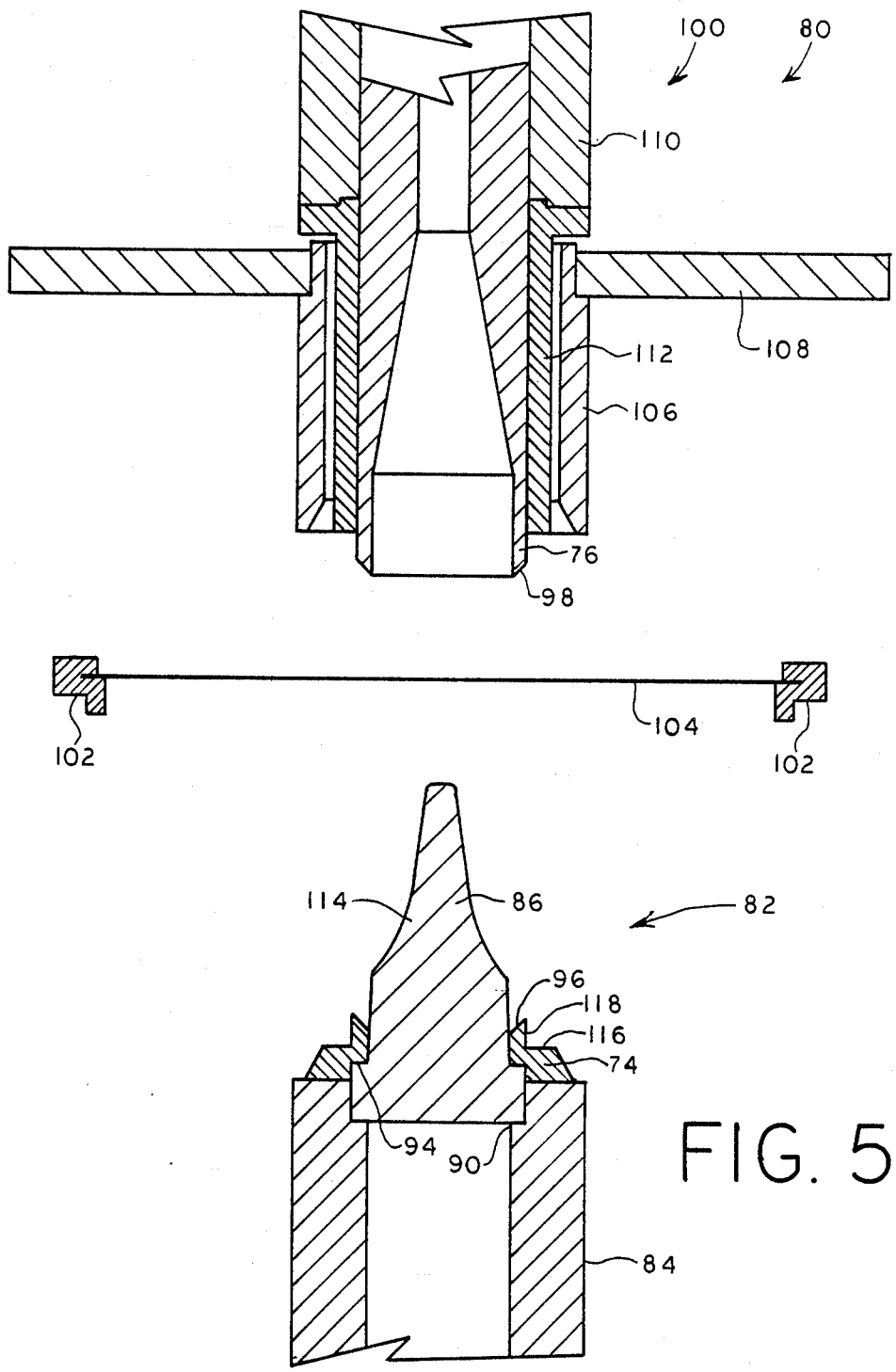
FIGS. 5-8 are sectional side views of the pressure box and male mold assemblies of a thermoforming machine omitting some accessories for greater clarity, and sequentially illustrating the formation of the hollow preformed liner of FIG. 4.

For producing the desired preformed liner configuration described above, a conventional thermoforming apparatus such as that disclosed in detail in U.S. Pat. No. 4,162,883 and hereby incorporated by reference, may be employed. FIG. 5 illustrates the portion of the thermoforming apparatus 80 necessary for an understanding of the manner in which the preformed liner 62 may be formed, and in particular the novel punch 74 and cooperating swage tool 76 for forming the desired lip portion 70 of liner 62. Indicated at 82 is a male mold assembly which is supported by, and axially extendable from, a lower support platform (not shown) of the thermoforming apparatus 80. Male mold assembly 82 includes a cylindrical base member 84 for supporting a generally conically shaped male mold member, or forming pin, 86. Also comprising male mold assembly 82 is an annular punch 74 having an annular recess 94 which cooperates with shoulder 90 to fixedly secure forming pin 86 in place. Punch 74 is secured in place by suitable means, such as by bolting, to base member 84. Integrally formed on punch 74 is annular beveled surface 96 which cooperates with correspondingly beveled tip 98 of swage tool 76 to form the desired lip configuration as hereinafter described.

The thermoforming apparatus as shown in FIG. 5 also includes a feed mechanism 102 for positioning and advancing a sheet of thermoplastic stock material 104 which is preheated to a deformable state by suitable means, such as radiant heaters, infrared lamps, etc. (not shown). In axial alignment with male mold assembly 82, and for cooperation therewith, is a pressure box assembly 100 positioned on the opposite side of sheet 104.

Pressure box assembly 100 independently performs the functions of isolating a disc shaped portion of liner sheet stock 104 and applying the proper tension thereto, aiding the formation of the liner lip configuration, and thereafter trimming the formed liner from the remainder of the liner sheet stock. To accomplish these functions, pressure box assembly 100 includes cylindrical shaped isolating frame 106 attached to plate 108, to which means (not shown) to axially advance and retract frame 106 are connected. Also axially advanceable and retractable by suitable means is cylindrical member 110 and die 112 mounted thereto for trimming the formed liner from the liner stock. Slideably mounted within die 112 is swage tool 76, which likewise is connected to means which allow its independent advancement toward male mold assembly 82 and retraction therefrom.

Figure 6:
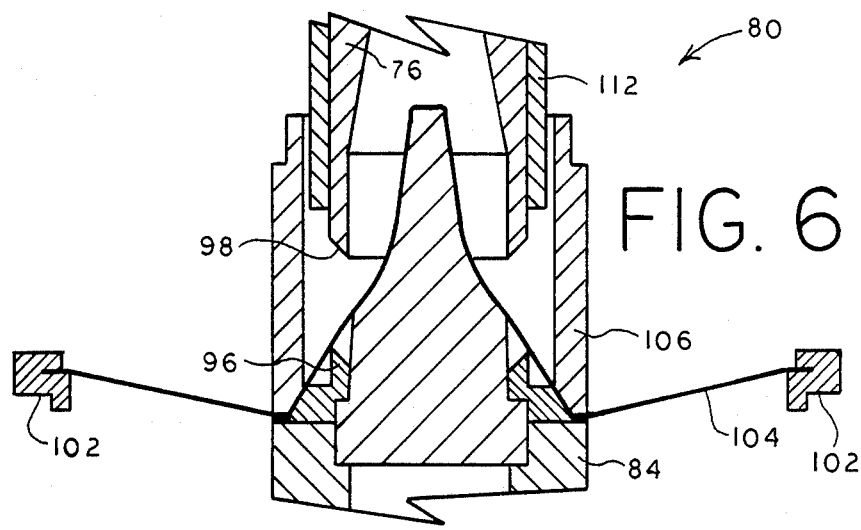

In operation, isolating frame 106 is first advanced towards the plane of sheet stock 104, which is spanned between feed mechanism means 102, to urge sheet 104 out of its initial plane. With the isolated disc shaped portion of sheet 104 placed in the proper tension by frame 106 it receives and is formed by forming pin 86 as it is axially extended to to toward pressure box assembly 100. FIG. 6 shows forming pin 86 and isolating frame member 106 in the fully advanced position with member 106 abutting against surface 116 of die 74 with sheet 104 therebetween. At this time, sheet 104 has been deformed to correspond to the contour of the body portion 114 of forming pin 86.

Figure 7:
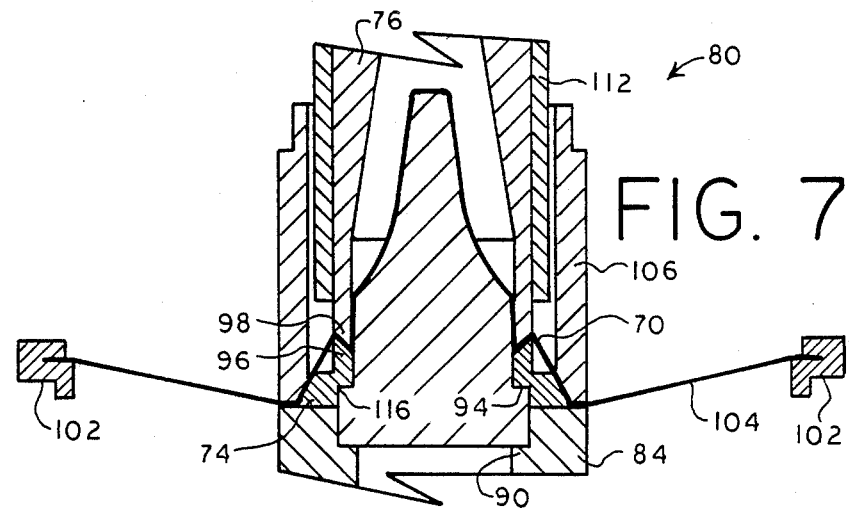
Figure 8:
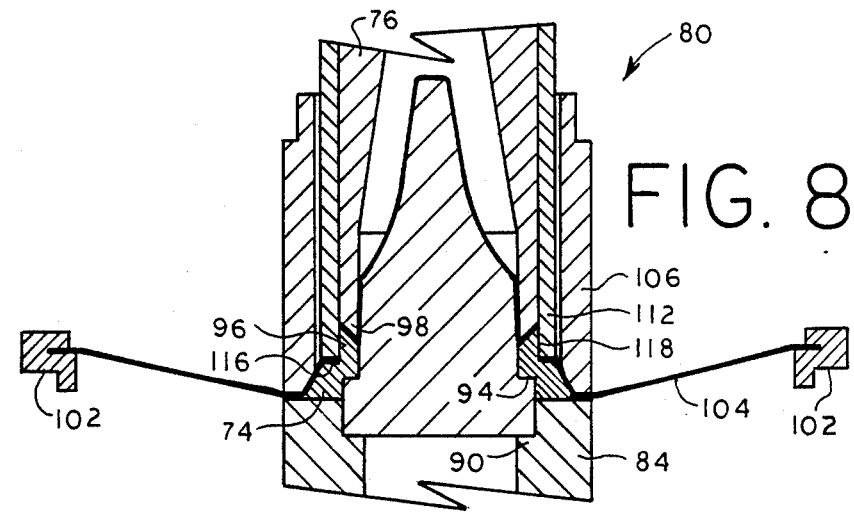

Next, as shown in FIG. 7, swage tool 76 with beveled swage tip 98 is advanced to meet and cooperate with correspondingly beveled surface 96 of punch 74 to thereby form preformed liner lip 70. After formation of lip 70, die 112 is advanced to the position shown in FIG. 8, passing along shearing surface 118 of punch 74 to cut preformed liner 62 away from the remainder of plastic sheet stock 104. Thereafter, male mold assembly 82 and pressure box assembly 100 are retracted to their respective initial positions and liner 62 is removed from forming pin 86.

Once the preformed liner has been formed it is transferred to an injection molding machine or an injection blow molding machine which may be of the type described in said aforementioned U.S. Pat. No. 4,309,380 which is hereby incorporated herein by reference. Briefly, that machine is of a rotary type design wherein a square shaped indexing platen or turret, with a plurality of core rods mounted on each side thereof, is rotated between four different operational stations. At the first station a preformed liner is fed onto the core rod and held in place by drawing a vacuum through a porous section of the core rod. At the second station, an injection mold is positioned around the core rod and liner. Thereafter, a molten plastic material, for forming the outer structural wall on of the container, is injected over the outside surface of the liner. At the third station a blow mold is positioned around the core rod and air pressure is exerted through the core rod into the interior of the liner having the injected plastic thereover. The internal air pressure expands or blows the liner with plastic injected therearound against the interior wall of the blow mold, thus resulting in the final container body configuration. At the fourth station the containers are ejected from the core rods, and the core rods thereafter indexed to the first station and the process is repeated.

Figure 9:
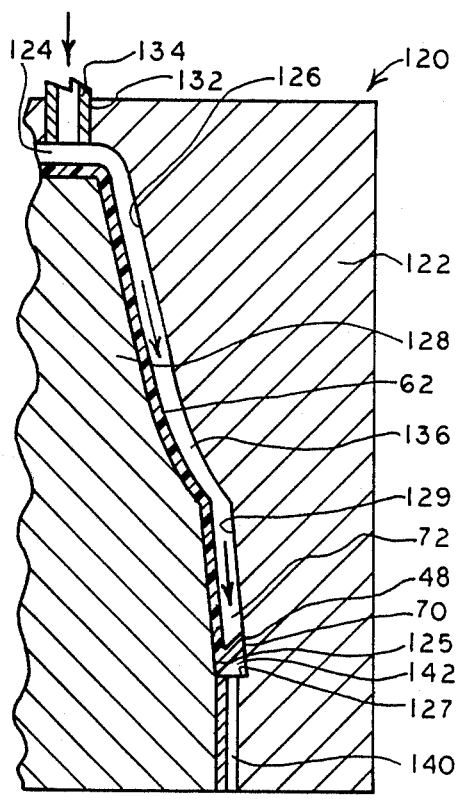
FIG. 9 is a sectional side view of an injection molding station of an injection blow molding machine showing a core rod with the preformed liner of FIG. 4 thereon and positioned in the mold cavity prior to the injection of the plastic for forming the outer wall of the container of the present invention.

In respect to the present invention, it is the injection molding operation which is of particular interest. In FIG. 9 there is shown the injection molding station 120 which includes mold 122 with cavity 124 and molding surface 126. Molding surface 126 includes rim forming surface 127 and side wall forming surface 129. Positioned within cavity 124 is core rod 128 with liner 62 inserted over its outer surface. Liner lip 70 extends from the core rods outer surface 125 with generally V-shaped portion forming a circumferential trough-like region 72 for reception of injected plastic.

Figure 10:
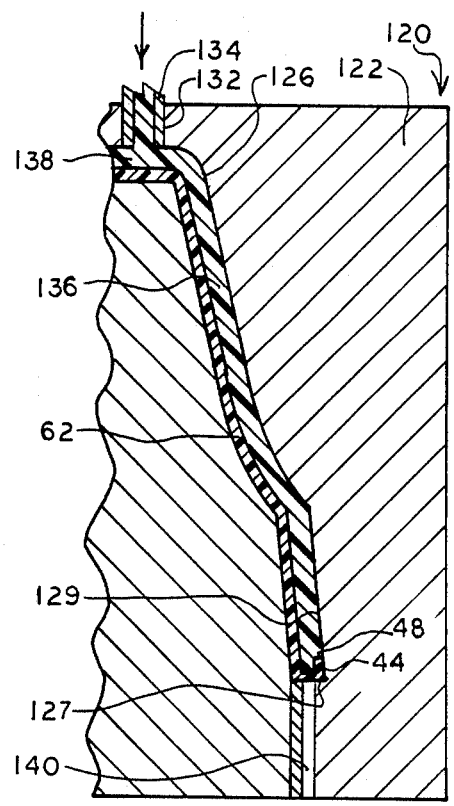
FIG. 10 is a sectional side view of the injection molding station of FIG. 9 after injection of the plastic material for forming the outer wall of the container.

Mold 122 also includes a bore 132 through which nozzle 134 is inserted for the injection of a plastic material into cavity 124 and around liner 62. As the molten plastic material is injected into the mold cavity 124, it fills the space 136 between liner 62 and molding surface 126 as it proceeds toward liner lip 70 following the arrows shown. As the plastic material 138 reaches trough-like region 72 the initially generally "V" shaped configuration of lip portion 70 is reformed to conform to the shape of the rim molding surface 127 and side wall molding surface providing the desired overhanging lip configuration as seen in FIG. 10 or FIG. 2. To accomplish the desired reformation an angle of approximately 20° to 60° preferably about 30°, between lip 70 and the adjacent liner side wall 65 has been found to be advantageous. However, depending upon the thickness of the outer wall and desired length of overlapping liner leg 44, it will be appreciated that any acute angle may have applicability to the present invention.

It is noted that as the liner lip 70 is forced downwardly by the introduction of plastic material 138, liner edge 48 slides along the side wall mold surface wall 129 in sealing relationship thereto, thus preventing the passage of the injection plastic material 138 past liner lip 70. To aid the reformation of liner lip 70 mold 122 may include a bore 140 permitting the escape of air in space 142 so as not to hinder formation of the desired over hanging lip configuration. However, it has been found that if the volume of space 142 is not excessive, the air therein may be relieved by passing upwardly between a liner edge 48 and mold surface 129 and thus in such case bore 140 is not required.

After complete injection of plastic material 138, mold 122 is removed from around core rod 128 and the injected over liner 62 and core rod is indexed to the blow molding station where the body of the container is blow molded to the desired shape as previously mentioned. Of course, it will be appreciated that a container of the present invention may also be formed by injection molding as described above without the requirement of a blow molding operation.

Although the teachings of the invention have herein been discussed with reference to certain specific disclosures and embodiments, it is to be understood that these are by way of illustration only and that others may wish to utilize the invention in different designs or applications.

For example the container may be formed with an inner structural wall with a liner on the outside of the container. In such a container, the liner is once again positioned so that it wraps over and around the rim of the container with the circumferential edge of the liner lip embedded in the structural wall. Thus, a cross sectional view of the left side of the rim area of an outer liner-inner structural wall arrangement will be identical to that shown in FIG. 2 which, as will be recalled, also shows the right side of a cross sectional view of the preferred inner liner outer structural wall embodiment of the present invention.

Figure 11:
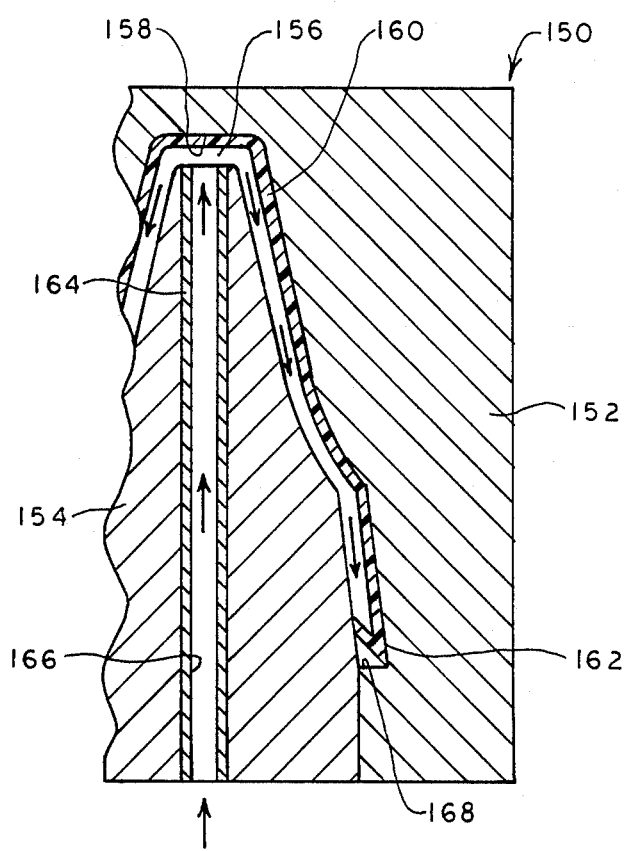
FIG. 11 is a sectional side view of the injection mold station of an injection mold machine showing the injection molding of a modified container of the present invention wherein the liner forms the outer layer of the container.

In FIG. 11 it is shown a modified injection molding station 150 whereat the modified container may be formed. Station 150 includes female mold member 152 and male mold member 154 forming a space 156 therebetween. Positioned along the inner surface 158 of female mold member 152 is a preformed liner 160 which may be held in place against surface 158 by suitable means such as a vacuum drawn through female mold member 152.

Liner 160 is identical to the liner described in conjunction with the preferred embodiment except that liner 160 has an inwardly, rather than outwardly, extending circumferential lip 162 about its opening. With male mold member 154 axially moved inwardly into position within female mold member 152 as is shown in FIG. 11, a thermoplastic material is injected through nozzle 164 fitted within bore 166 of male molding member 154. The thermoplastic material follows the path of the arrows shown in FIG. 11 so that space 156 between the male mold 154 and liner 160 is filled with the injected plastic to form the inner structural wall. In a manner similar to that described in connection with the preferred embodiment, the injected plastic forces liner lip 162 downwardly against rim forming surface 168 of female mold 152 to reform the lip 162 into the desired over hanging and over wrapping lip configuration as shown in FIG. 2 and described above. Liner 162 with the injected plastic wall on this inner surface is removed from male molding station 150 and thereafter may be transferred to a blow molding station and an expanded container body can be blow molded as previously described.

What is claimed is:

1. A method of producing a multiwalled plastic container having a first wall means and a second wall means comprising:

providing a pre-formed thermo-plastic hollow first wall means, said first wall means having a sidewall having an inner and outer surface and defining an opening, said first wall means also having circumferentially-extending lip about said opening, said lip forming an acute angle with said sidewall to provide a trough-like region;

placing said first wall means in an injection-mold cavity having a molding surface to thereby provide a space between first wall means and said molding surface;

injecting a molten plastic material into said space to form said second wall means, said injected plastic entering the trough-like region and re-forming the configuration of said lip, said injected plastic material forming a circumferential rim on said second wall means defining an opening and said injected plastic material forcing said lip against said molding surface to re-form said lip to wrap over and around said rim of said second wall means; and, removing said first and second wall means from said molding cavity.

2. The method of claim 1, wherein said reformation of said lip produces an edge which is embedded in said second wall means and having an outer surface that is flush with an adjacent surface of said second wall means.

3. The method of claim 1, wherein said acute angle is in the range of approximately 20° to 60°.

* * * * *